(12) United States Patent
Vlasov et al.

(10) Patent No.: US 10,402,823 B1
(45) Date of Patent: Sep. 3, 2019

(54) SYSTEM FOR EXCHANGING PRIVATE KEYS FOR MUTUAL SETTLEMENTS BETWEEN USERS OF A CRYPTOCURRENCY OUTSIDE BLOCKCHAINS

(71) Applicants: Alexander Vladimirovich Vlasov, Moscow (RU); Vadim Borisovich Leonovich, Moscow (RU)

(72) Inventors: Alexander Vladimirovich Vlasov, Moscow (RU); Vadim Borisovich Leonovich, Moscow (RU)

(*) Notice: Subject to any disclaimer, the term of this patent is extended or adjusted under 35 U.S.C. 154(b) by 0 days.

(21) Appl. No.: 16/236,567

(22) Filed: Dec. 30, 2018

(51) Int. Cl.
G06Q 20/38 (2012.01)
H04L 9/32 (2006.01)
H04L 9/30 (2006.01)
G06Q 20/06 (2012.01)
H04L 9/08 (2006.01)

(52) U.S. Cl.
CPC ....... G06Q 20/3829 (2013.01); G06Q 20/065 (2013.01); H04L 9/0894 (2013.01); H04L 9/3066 (2013.01); H04L 9/3236 (2013.01); G06Q 2220/00 (2013.01); H04L 2209/56 (2013.01)

(58) Field of Classification Search
CPC ............. G06Q 20/3829; G06Q 20/065; G06Q 2220/00; H04L 9/0894; H04L 9/3066; H04L 9/3236; H04L 2209/56
USPC ......................................................... 705/71
See application file for complete search history.

(56) References Cited

U.S. PATENT DOCUMENTS

| 10,068,228 | B1* | 9/2018 | Winklevoss | ....... G06Q 20/3829 |
| 10,110,576 | B2* | 10/2018 | Ateniese | ............... G06F 3/0619 |

(Continued)

FOREIGN PATENT DOCUMENTS

| WO | 2017145008 A1 | 8/2017 |
| WO | 2017145010 A1 | 8/2017 |

OTHER PUBLICATIONS

Binu et al., Threshold Multi Secret Sharing Using Elliptic Curve and Pairing, Mar. 31, 2016, 13 pages (Year: 2016).*

(Continued)

Primary Examiner — James D Nigh
(74) Attorney, Agent, or Firm — Bardmesser Law Group

(57) ABSTRACT

System for cryptocurrency transactions, includes a server configured to mediate exchange of data between user devices; an internal currency derivable from any cryptocurrency; each user device configured to issue, transfer rights, redemption and restoration of an internal currency unit. Issue includes creation of new addresses in blockchain, protected by splitting the private key PrivKey into first part (PrivKey1) and second part (PrivKey2), and requires connection to the blockchain only once, to generate PrivKey and to split PrivKey into PrivKey1 and PrivKey2, based on PrivKey*G=(PrivKey1*PrivKey2)*G. PrivKey1 is generated and stored in the server, PrivKey2 is generated on the user's device. The server stores all PrivKey1's device IDs of the user's device. Redemption requires both PrivKey1 and PrivKey2; public key PublicKey of each internal currencies unit is PrivKey1*(PrivKey2*G)=PrivKey2*(PrivKey1*G)=PublicKey; user with PublicKey can check balance for the corresponding private key PrivKey but needs PrivKey to redeem/transfer.

19 Claims, 9 Drawing Sheets

(56) References Cited

U.S. PATENT DOCUMENTS

| | | | | |
|---|---|---|---|---|
| 2015/0262171 | A1* | 9/2015 | Langschaedel | G06Q 20/065 705/71 |
| 2017/0250972 | A1* | 8/2017 | Ronda | H04L 9/08 |
| 2018/0351754 | A1* | 12/2018 | Wallrabenstein | H04L 9/3278 |
| 2018/0367298 | A1* | 12/2018 | Wright | H04L 9/0861 |
| 2019/0043048 | A1* | 2/2019 | Wright | H04L 9/0643 |
| 2019/0052461 | A1* | 2/2019 | Kreder, III | G06F 21/78 |
| 2019/0158470 | A1* | 5/2019 | Wright | H04W 4/70 |
| 2019/0182042 | A1* | 6/2019 | Ebrahinni | H04L 9/0894 |

OTHER PUBLICATIONS

Combining ECDSA keys, Stack Overflow, Jul. 31, 2013, 1 page (Year: 2013).*

Dutta et al., Pairing-Based Cryptographic Protocols: A Survey, Cryptology Research Group Stat-Math and Applied Statistics Unit, 46 pages, Jun. 14, 2004 (Year: 2004).*

Shamir "How to Share a Secret", Association for Computing Machinery, 1979, 2 pages (Year: 1979).*

Sullivan, A (Relatively Easy to Understand) Primer on Elliptic Curve Cryptography, Oct. 24, 2013, blog.cloudfare.com, 20 pages (Year: 2013).*

"What Are Addresses on Blockchains? Blockchain Address 101", https://blockgeeks.com/guides/blockchain-address-101/, 15 pages, Jun. 19, 2017 (Year: 2017).*

"A complete history of Bitcoin's consensus forks", Bitmex Research, 14 pages, Dec. 28, 2017 (Year: 2017).*

Bellare et al., "Verifiable Partial Key Escrow", 22 pages, Nov. 1996 (Year: 1996).*

Porkodi et al., "Group-oriented (k,n) signature schemes on exponentiation of primitive root and Elliptic Curve", Department of Mathematics and Computer Applications, PSG College of Technology, 2008, 8 pages (Year: 2008).*

"Technical background of version 1 Bitcoin addresses", Bitcoin Wiki, 3 pages, retrived from https://en.bitcoin.it/wiki/Technical_background_of_version_1_Bitcoin_addresses (Year: 2019).*

* cited by examiner

SYSTEM FOR EXCHANGING PRIVATE KEYS FOR MUTUAL SETTLEMENTS BETWEEN USERS OF A CRYPTOCURRENCY OUTSIDE BLOCKCHAINS

BACKGROUND OF THE INVENTION

Field of the Invention

The present invention allows users to carry out mutual settlements in cryptocurrencies without being connected to the blockchain at all times.

Background of the Related Art

The general principles of the system described herein are illustrated using the example of cryptocurrency, although the concept is not limited to this, and can be applied to other digitally owned assets, such as bonds, stocks, vouchers, etc. The primary requirement is the existence of an identifier (in the case of the cryptocurrency—the private key) that can be owned, and which confirms ownership.

In the description below, Bitcoin is used as an example, of cryptocurrency, although the principles described herein can be applied to any other cryptocurrency. A number of significant drawbacks exist that prevent existing cryptocurrencies from being used as a "universal tender":

(1) Transaction costs. Although originally declared to be cheap, actual transactions made in cryptocurrencies are not all that cheap. When a new block is mined on the net, the miner puts information on transactions there. A block has limited size, so it cannot possibly hold all queued transactions. Since a miner gets processing fees for all transactions they will put into the block, they will inevitably choose ones with higher processing fees. As a result, if there are many transactions in the system, this will lead to an increased average fee.

(2) Low speed of transactions. For Bitcoin, the most popular cryptocurrency, a minimum transaction time is the time needed to locate a new block, i.e., about 10 minutes.

(3) Anonymity. Anonymity can be preserved only until the cryptocurrency is exchanged for fiat money. Also, anyone can have access to the entire transaction history for all time and for any wallet.

(4) Scalability. For Bitcoin, the maximum number of transactions is 7 per second. A block for storing transactions has the size of 1 MB. It takes usually about 10 minutes to mine a new block. A transaction has the size of 226 bytes minimum. Therefore, only 4,000 transactions can be performed within 10 minutes, i.e., 6.6 transactions per second.

(5) Transaction reversibility. It is impossible to reverse or cancel a transaction if the payer has made a mistake.

Accordingly, there is a need in the art for a cryptocurrency system that addresses the above shortcomings.

SUMMARY OF THE INVENTION

The main object of the proposed "Rune Payment System" project (hereinafter referred to as the Project, the System, or Rune) is to popularize and expand the use of cryptocurrencies in everyday life.

Another object is to establish a novel and innovative ecosystem for mutual settlements.

The proposed system is a universal way of carrying out mutual settlements between the users, both individuals and legal entities. Being accessible and intuitive to everyone, the proposed system boasts a low entry threshold. Its basic structural and operational principle are simple and intuitive, making it completely transparent and trustworthy. The following disclosure, describing methods and preferred embodiments, will also focus on security issues.

The fundamental principles of the proposed system are its maximum simplicity and convenience. The proposed system achieves its objectives by using novel methods and tools for making payments in cryptocurrencies, outside blockchains.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
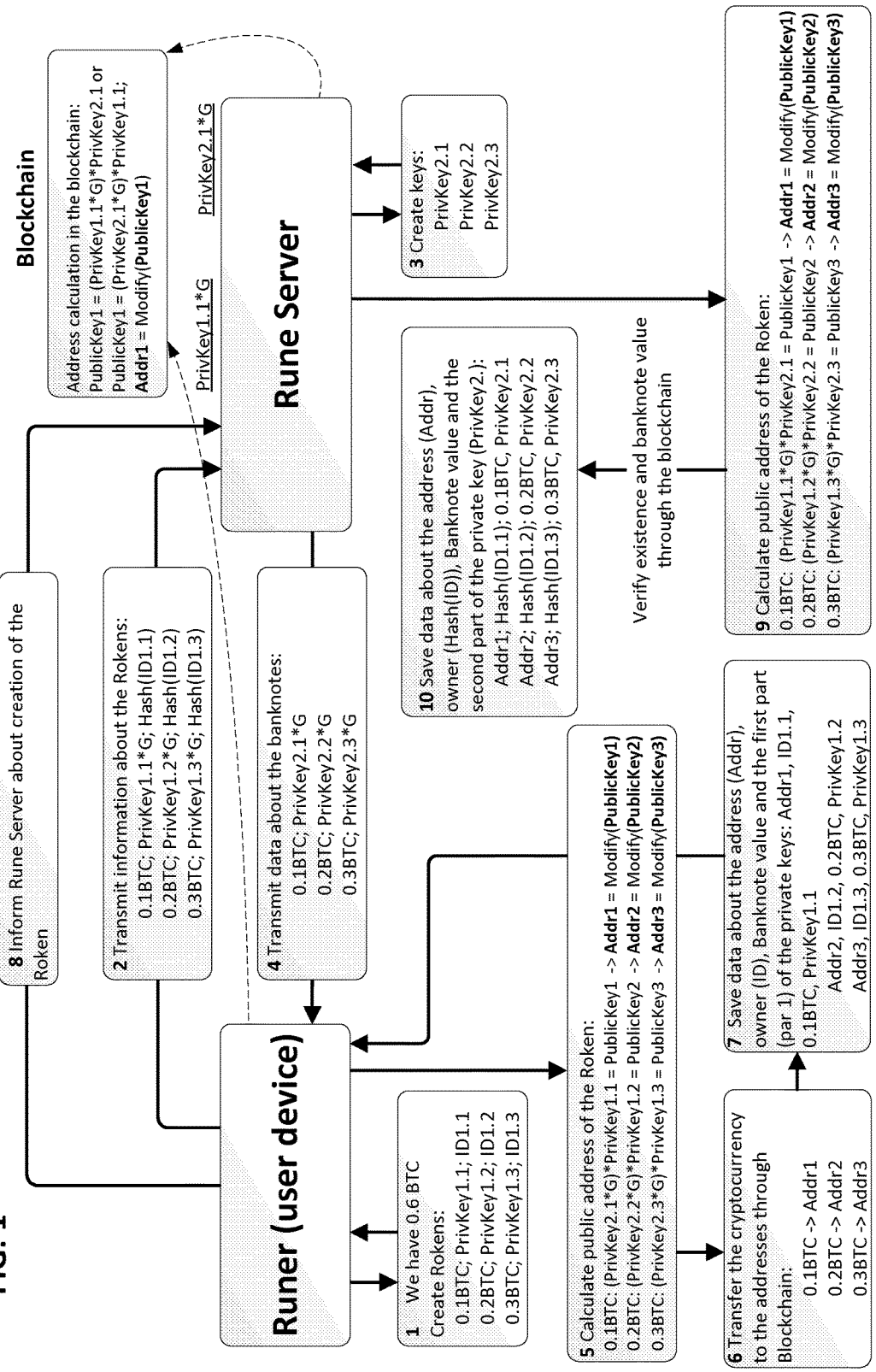
FIG. 1 illustrates the process of Roken emission.

Reference will now be made in detail to the preferred embodiments of the present invention, examples of which are illustrated in the accompanying drawings.

Terms and Definitions

Rune is a system for exchanging data between user devices (see Runer), the server and PC/smartphone/tablet applications, which allows to carry out transactions in blockchain-based cryptocurrency systems, or to emit, transfer, and redeem its system-specific digital money (see Roken) outside blockchains.

Roken (Rune+tOKEN) is an internal currency in the Rune System, i.e., an electronic currency unit that has a unique identified in the Rune System, which describes the ownership rules for a given cryptocurrency unit.

Runote (RUne+NOTE) is a visual appearance of a link to a specific Roken in the Rune System, in the form of a banknote that is printed on paper, plastic or any other material, or in the form of an image file.

Runer is a device or an application that works with the internal currency units, i.e., a hardware (cold) cryptowallet or a software (hot) cryptowallet having additional functions in the Rune System. The device is capable of generating and storing private keys, as well as of signing blockchain transactions. Additional functions include user identification in the Rune System and operations with Rokens.

Roken lifecycle consists of a sequence of stages: emission (generation), single or multiple transfers of ownership rights between the users of the Rune System, right status checks (scanning), and, finally, redemption.

Roken emission (issue) is a procedure of generating Rokens in the Rune System, where each Roken unit is associated with a specific amount of a selected cryptocurrency. This procedure is carried out as a blockchain transaction.

Roken transfer is a procedure of changing ownership of a Roken that may be initiated by the current holder.

Roken scanning is a procedure that provides the user of the Rune System with the information on the current ownership and status of a Roken.

Roken redemption is a procedure of making a specific Roken not usable in the Rune System anymore, i.e., this procedure makes the ownership rights of the cryptocurrency units, from which that Roken was derived, void, transferring the whole amount of the cryptocurrency into a block-chain.

Hardware (cold) cryptowallet is a hardware-based solution, i.e., a device, that stores private keys, protecting them both from physical and from software point of view, that requires no Internet or blockchain connection, and also does not require the user to install any third-party software. At the same time, given access to the Internet or a blockchain, the device would allow to check and create blockchain transaction.

Software (hot) cryptowallet is a software-based solution, i.e., an application or a service, that may be installed on a smartphone, tablet, or PC to store private keys in the device's file system, or on a remote server, that is connected to the Internet and capable of checking, creating and transferring blockchain transactions.

Rune System Concept Description

Cryptowallets store private keys (PrivateKey) that allow to use a cryptocurrency. A computer where the host-client application for cryptowallet is installed is more vulnerable to attacks, since the private key has to be stored on some potentially accessible medium. A cold cryptowallet does not have a continual access to the Internet, so it may be used for a more secure storage of the cryptocurrency. A software cryptowallet usually stores a user's private keys on a PC or on the server, while a hardware cryptowallet is a stand-alone device that stores private keys inside itself.

Roken Currency Unit

The claimed system is based on a Roken, an electronic tender, which reflects ownership rights for a cryptocurrency in the Rune System that were conferred to the user at the moment of emission.

Each Roken has a certain value in the units of the cryptocurrency (supported by the Rune System) that was selected at the moment of emission. In fact, a Roken is a token for a certain amount of the selected cryptocurrency that allows the user to use it not only in a blockchain, but in the Rune System as well. Any Roken transaction, such as emission, right transfer, or redemption, may be performed only through the Runer device or the Runer application.

Thus, a Roken has its private key that is divided into two parts (using the cryptographic principle of sharing a secret), where the first part is generated on the Runer device or in the Runer application and then stored there, and the second part is generated on the Rune server and then stored there. Only the person having access to both parts of the Roken's private key can redeem it. Even if either part of the private key is compromised, a scammer will not be able to perform any transaction with the Roken.

The secret sharing is implemented using the feature of multiplying points on an elliptical curve:

$$PrivKey*G=(PrivKey1*PrivKey2)*G \qquad (1)$$

where PrivKey is the Roken's private key (within the meaning of an asymmetric encryption scheme);

PrivKey1 is the first part of the private key stored in the Runer application;

PrivKey2 is the second part of the private key stored on the Rune server; and

G is a base point on the elliptical curve.

The following statement is also true:

$$PrivKey1*(PrivKey2*G)=PrivKey2*(PrivKey1*G)= \\ PublicKey \qquad (2)$$

where PublicKey is the Roken's public key (as that term is used in asymmetric cryptography);

PrivKey1*G is the first part of the public key stored in the Runer application; and PrivKey2*G is the second part of the public key stored on the Rune server.

The Roken private key consists of two parts: PrivKey1 И PrivKey2. The first part of a private key is generated on the Runer device or in the Runer application and then stored there; it is also used to transfer ownership rights to another user. The second part of a private key is generated on the Rune server and then stored there. Neither the Rune server, nor the user has full access to the address (actual access to Roken's private key). However, signing any transaction with a given Roken requires both parts of its private key.

The Roken holder can be identified using the unique identifier of a banknote, a Roken ID, which is generated on the Runer device or in the Runer application of the Roken holder, when the Roken is emitted, and then transferred to the Rune server as a hash value.

The Roken holder may be changed only after the required Roken ID is transferred to the Rune server, together with the hash value of the new Roken ID that has been generated by the new holder.

In order to redeem a Roken, the current Roken ID has to be transferred to the server, together with its hash value. The server responds with PrivKey2. After that, the given Roken is eliminated from the Rune server, and the holder can use it for any blockchain transactions.

The server also stores other information about each Roken.

Roken Emission (Issuance)

Using their Runer device or the Runer application, any user can emit (issue) their own custom Rokens of any value, number, and cryptocurrency. As a result, they receive a specified number of Rokens with specified values.

The process of Roken emission/issuance is, basically, a blockchain transaction with multiple outputs.

The number of outputs is the number of Rokens to be emitted (issued).

Since each Roken has a real blockchain address, it is possible to check its balance any time.

FIG. 1 illustrates the process of Roken emission (issuance). As shown in FIG. 1, the Rune System provides the following sequence for emitting Rokens:

(1) Emitting new Rokens, the user inputs the desired number of banknotes and their values. Then, the Runer device (or application) automatically generates a private key PrivKey1 (first part) and an ID1, wherein the number of PrivKey1 and ID1 corresponds to the number of Rokens to be emitted.

(2) Then, the Runer device (or application) sends a request to the Rune server to create the necessary number of Rokens, containing the following information for each Roken note to be emitted:
  value (amount);
  public key (PrivKey1*G, in this case, the coordinates on the elliptical curve that correspond to the first part of the private key);
  Hash(ID1)—this field is used by the Rune server to check the ownership of a given Roken;

(3) Responding to the Runer device request, the Rune server generates the second part of the private key (PrivKey2) for each Roken note.

(4) Then, the Rune server transfers the second part of public keys (PrivKey2*G) for each Roken note (or the coordinates on the elliptical curve that correspond to the second part of the private key (PrivKey2)) to the Runer device.

(5) The Runer device (or application) computes the shared public address (Addr, generated from PublicKey) in a blockchain (see equation (2) above).

(6) The Runer device (or application) transfers cryptocurrency to the addresses of the newly emitted Rokens (Addr).

(7) The information about emitted (issued) Roken notes is stored on the Runer device.

(8) A request is sent to the Rune server on whether the necessary amount of a cryptocurrency has been transferred to public addresses of Roken notes.

(9) Using its information, the Rune server obtains the public address, calculates its PublicKey=PrivKey2* (PrivKey1*G) (see equation (2)), and then checks its blockchain balance.

(10) The Rune server stores the following data of each Roken note:
  public address (Addr);
  value (amount);
  Hash(ID1);
  PrivKey2.

Changing Roken Ownership

For a Roken note to change hands, its current holder has to transfer certain information to its new holder. The Rune System provides two ways of transferring said information:
  online, via the server (using an encrypted channel); or
  offline, via Runote paper notes.

These modes are different in that they use different data transfer channels.

Roken e-banknote

Figure 2:
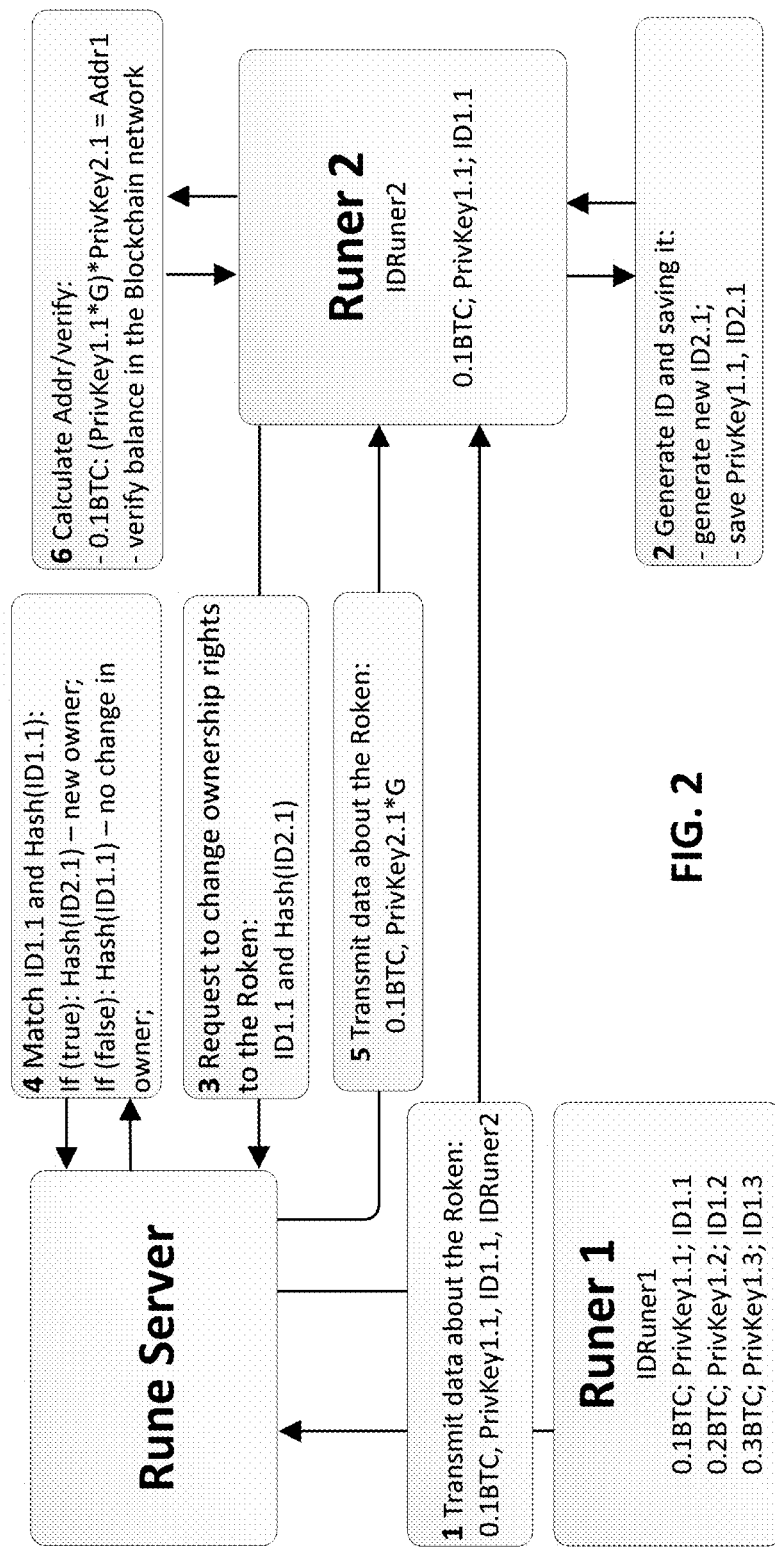
FIG. 2 illustrates the process of changing the ownership of a Roken note in online mode.

FIG. 2 illustrates the process of changing the ownership of a Roken note in online mode.

As shown in FIG. 2, the Rune System uses the following algorithm for online transfer of Rokens:

(1) The current holder of the Roken note (Runer1), initiating the transfer, sends the following information to the new holder (Runer2):
  value (amount);
  $1^{st}$ part of the private key (PrivKey1);
  banknote ID1;
  IDRuner2

The information is sent over the Rune server, so that the information goes directly from Runer1 to Runer2. If Runer2 is offline, the server will issue a notification on suspended payment.

(2) The new holder (Runer2) generates a new ID2.1 of the banknote and stores it with the banknote information received from Runer1.

(3) To change ownership, Runer2 sends both the old ID1.1 and the new ID2.1 to the Rune server.

(4) The Rune server computes Hash (ID1.1) and searches its database for an equal value. When found, this value is replaced with Hash (ID2.1), thus finalizing the change of ownership for the given Roken. From now on, the user possessing ID2.1 is considered the holder—namely, Runer2.

(5) The server sends the following data to the new holder (Runer2):
  Runer banknote value;
  2nd part of the public key PrivKey2*G for the given banknote.

If the banknote has already been redeemed, or its value is not as requested (the input amount was spent), the server will deny the transaction.

(6) Based on the server's public key (PrivKey2*G) and a part of the private key PrivKey1, the device computes the public address (Addr) of the banknote in a blockchain and then verifies whether the claimed Roken value (amount) is correct.

The Rune System also allows to transfer Roken banknotes to users, who are currently offline (e.g. their devices are turned off or disconnected from the Internet). The algorithm remains the same (see FIG. 2), however, it includes the "deferred transfer" feature, i.e., the server will be sending requests to the Runer device or the Runer application and wait for response from them until they are online again.

Roken Paper Note

Runote paper notes are images that contain a certain amount of information, that are printed on ordinary paper. By transferring a note, the user also transfers the rights to use the given Roken. When using a Runote, the transaction algorithm stays the largely same as with electronic Rokens, barring some differences. This method can be referred to as "offline, via Runote paper notes".

Also, a PIN code may have to be entered, which is an additional security measure to protect the information on the note from unauthorized reading.

Figure 3:
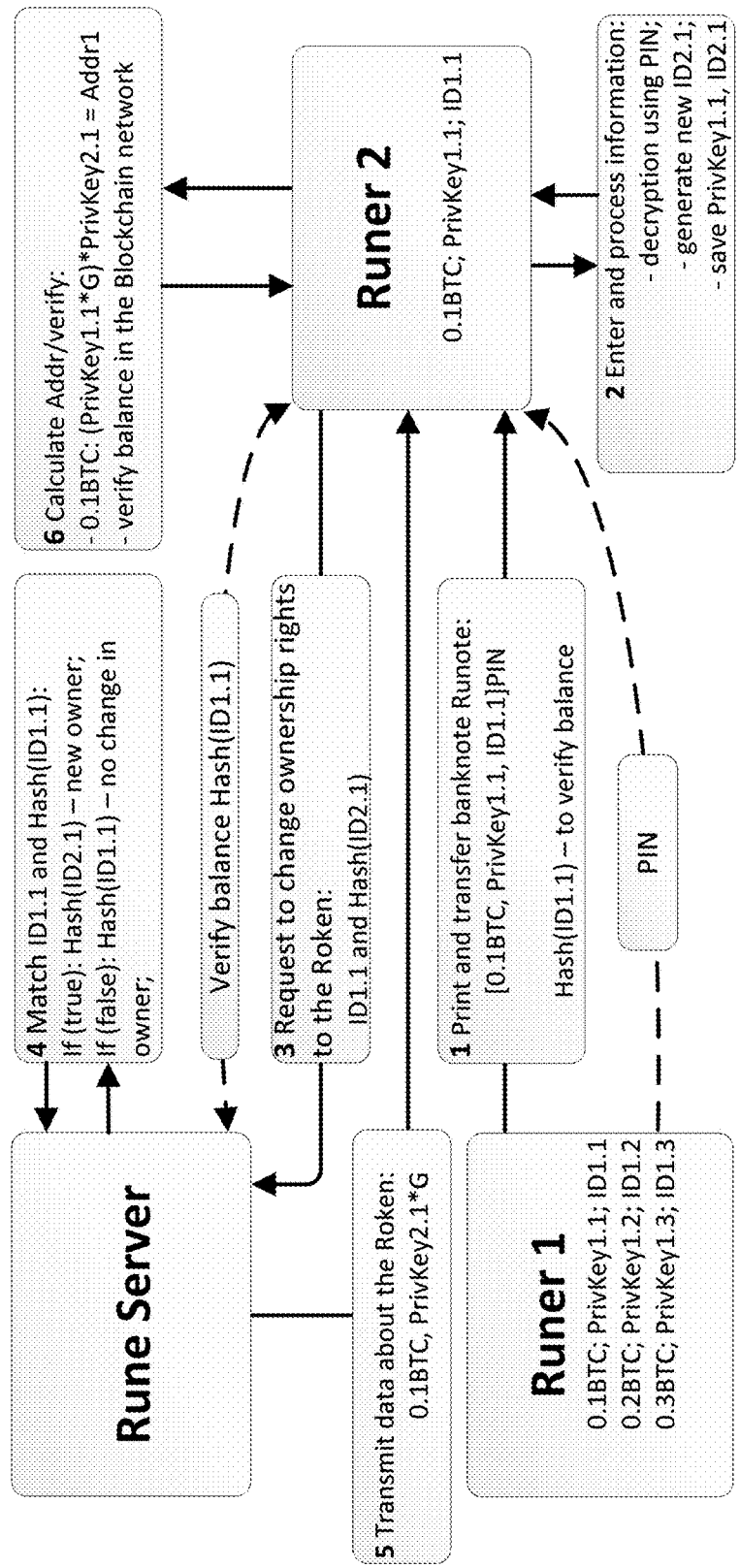
FIG. 3 illustrates the process of changing the holder of a Runote paper note.
Figure 4:
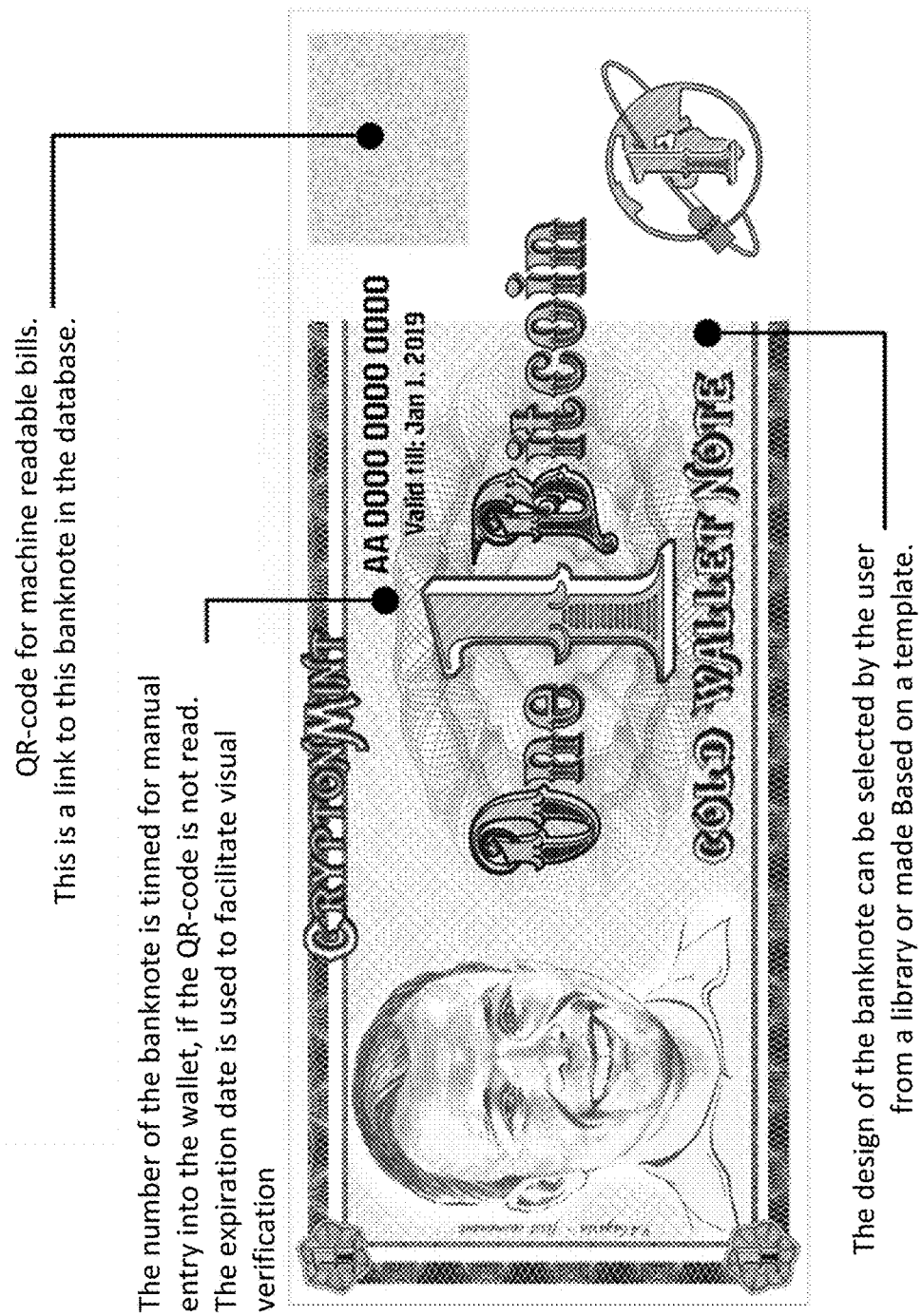
FIG. 4 illustrates an exemplary draft banknote.

FIG. 3 illustrates the process of changing the holder of a Runote paper note, and FIG. 4 illustrates an exemplary draft banknote.

Also, a Runote has the following features:
A Runote note has two fields:
  Value information, encrypted using the PIN code:
    Private key PrivKey1.1 ($1^{st}$ part);
    ID1=$[0.1BTC, PrivKey1.1, ID1.1]_{PIN}$;
  Hash(ID1.1), which may be used to verify the value (amount) of the given Runote (via server).

The PIN code is set by the Runote holder before it is created; it should only be transferred to a new holder, if at all.

After a new banknote has been activated by a new holder, the given Runote is no longer active and becomes invalid.

Roken Banknote Redemption

Figure 5:
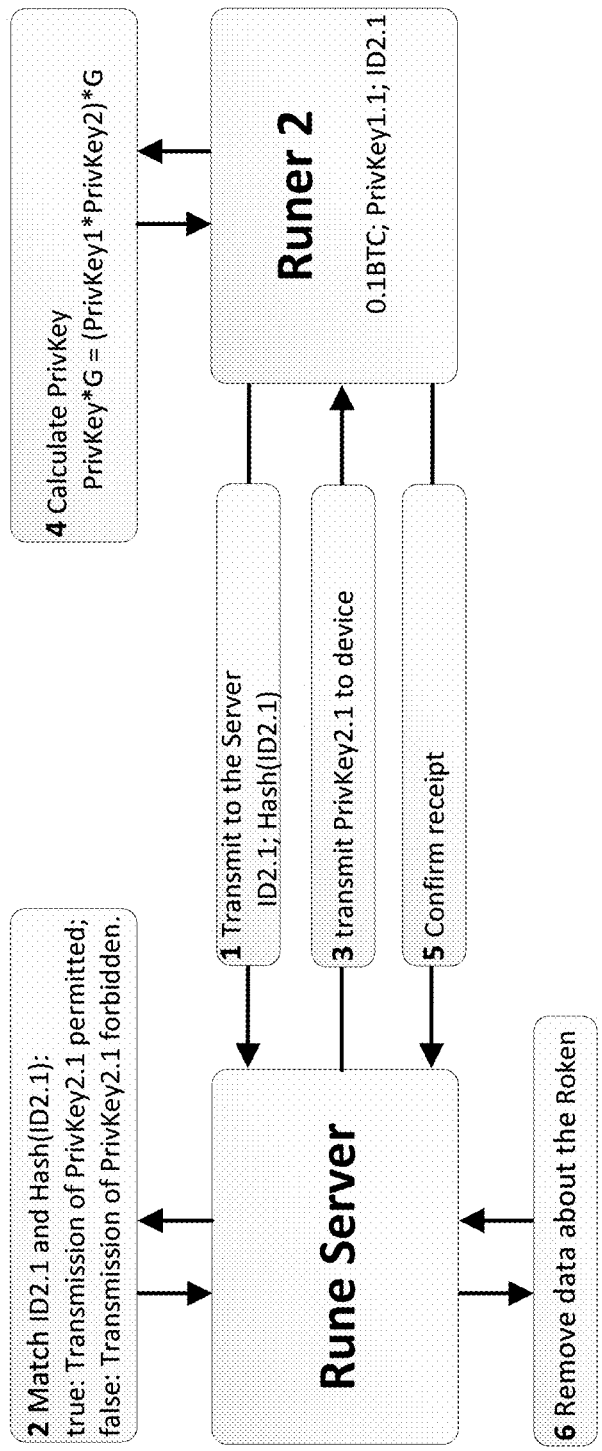
FIG. 5 illustrates the process of redeeming a Roken banknote.

Redemption of a Roken banknote involves the Rune server transferring the second part of the private key PrivKey2 to the holder thus giving them full control of the address and enabling them to perform blockchain transactions. FIG. 5 illustrates the process of redeeming a Roken banknote. As shown in FIG. 5, the Roken redemption process includes the following steps:

(1) The Runer devices or the Runer application transfers Rune note IDs to the server, together with the Hash (ID) value, which constitutes a request for the $2^{nd}$ part of the private key PrivKey2.

(2) The server verifies that the ID and Hash (ID) values are consistent, comparing them with those stored on the server.

(3) In case the verification in step 2 is successful, the server transfers the $2^{nd}$ part of the private key PrivKey2.1 to the Runer device or the Runer application.

(4) The Runer device or the Runer application restores the complete private key of the given Roken in a blockchain (PrivKey*G=(PrivKey1 *PrivKey2)*G).

(5) Upon receiving the data, the Runer device or the Runer application notifies the server that everything is correct.

(6) The server deletes the data about the given Roken note, or marks them as deleted.

Encrypted "Device-Server-Device" Channel

The following is the description of the "online, via the server (using an encrypted channel)" method.

To ensure that the data exchange between users is secure, the system employs secure communications channels. The Rune server stores a database of public keys from each Runer device and application. Note that these keys are used only to set up communications channels and have nothing to do with blockchain transactions themselves.

The public and private keys for each Runer device are generated when such device is manufactured, or when the Runer application is installed. Each public key is then stored in the server's secure memory, and both keys are stored in the secure memory of the Runer device or in the file system of the Runer application.

Figure 6:
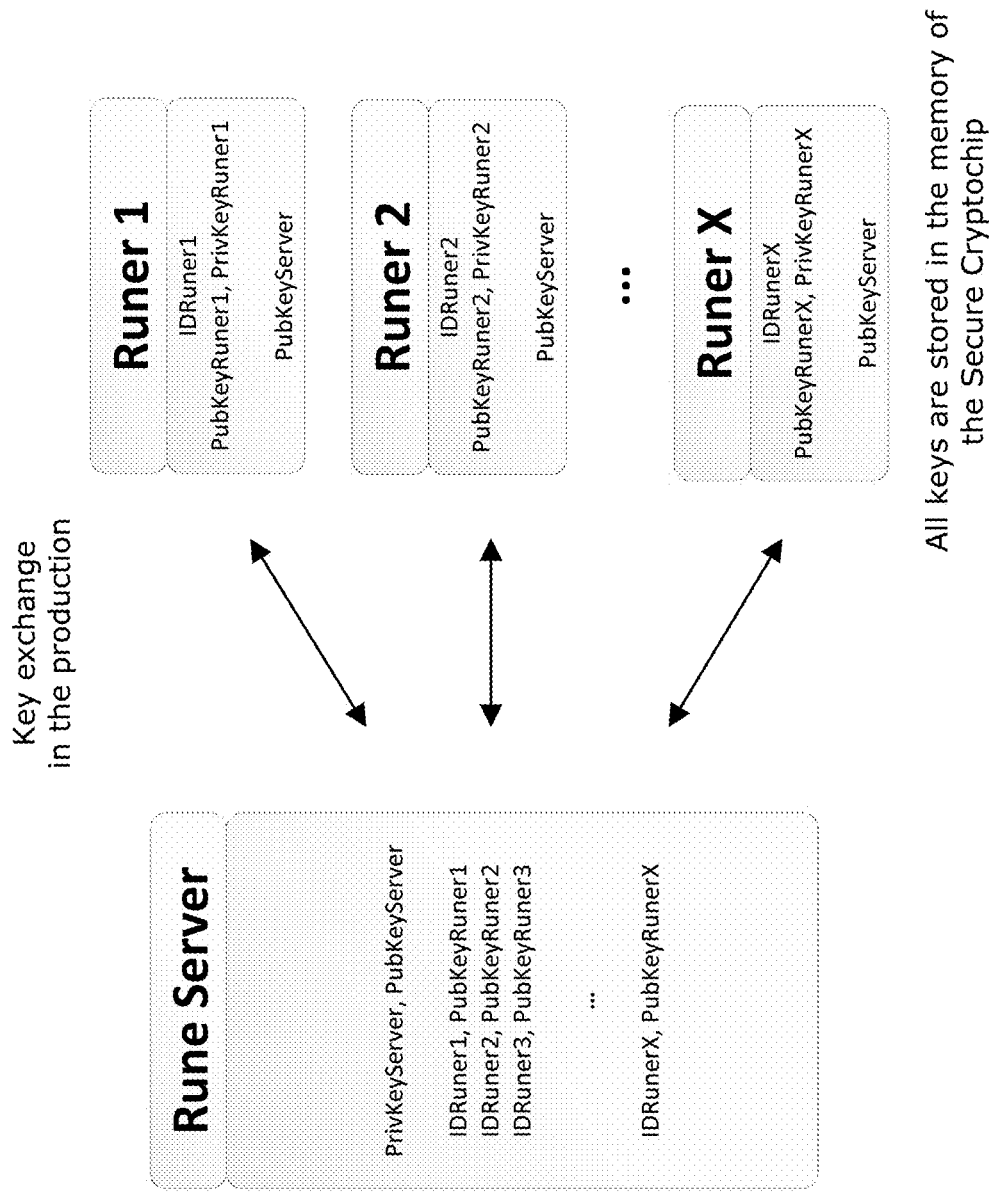
FIG. 6 illustrates an exchange of keys between devices and the server during production.

In addition, the server stores its own public and private keys. The server's public key is also sent to the Runer device or the Runer application. FIG. 6 shows an exchange of keys between devices and the server during production. The keys are used to encrypt the data exchange between devices or between Runer applications and servers.

Figure 7:
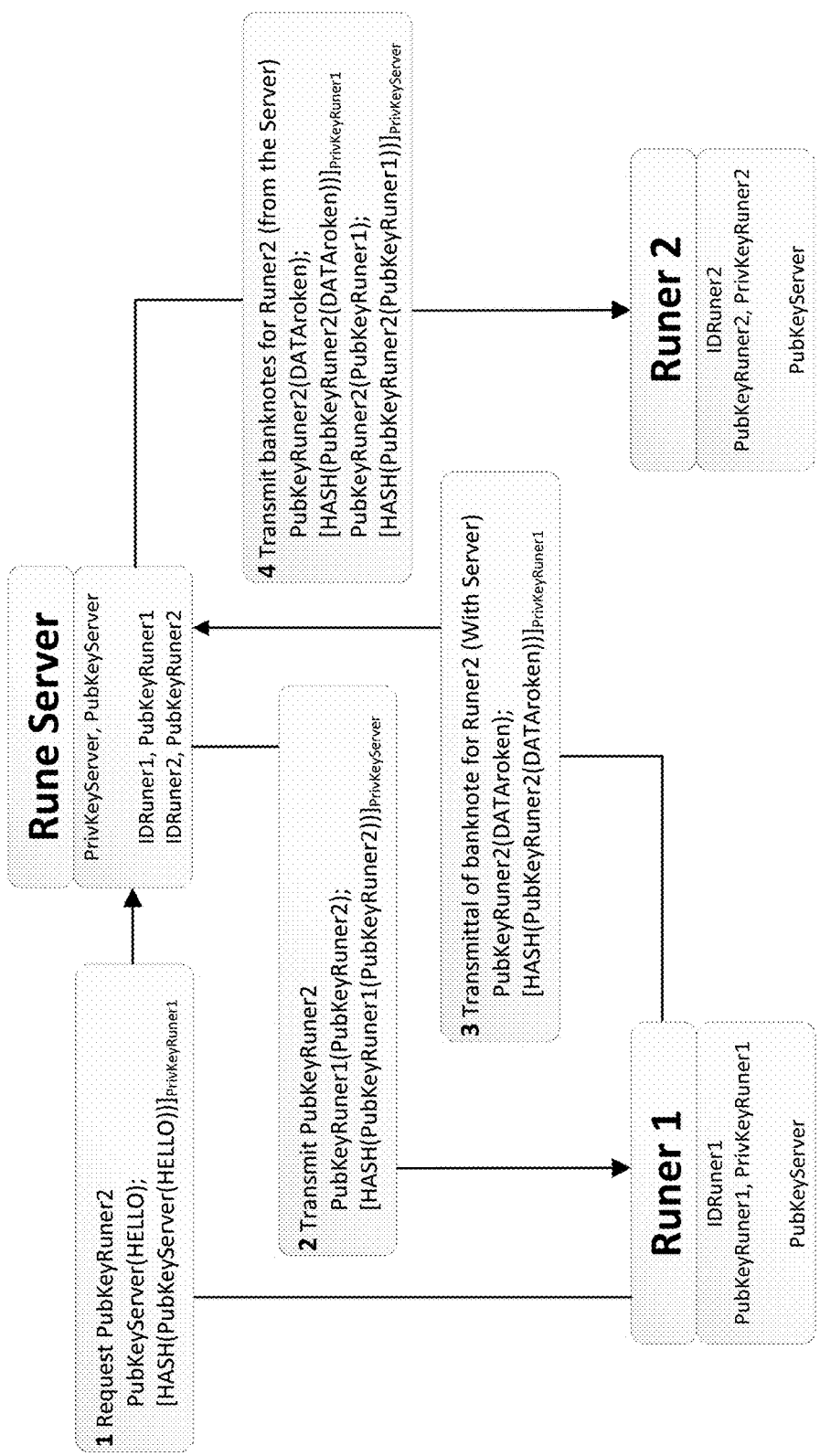
FIG. 7 illustrates an algorithm for establishing a secure communications channel between two Runer devices.

FIG. 7 illustrates an algorithm for establishing a secure communications channel between two Runer devices. The algorithm for a secure communications channel between two Runer devices includes the following steps:

(1) Device Runer1 sends a request (HELLO) to the Rune Server in order to receive the public key PublicKeyRuner2 for the device Runer2. This is needed in order to encrypt the transmitted data. The request is encrypted using the server's public key:

PubkeyServer(HELLO)

Thus, the only way the message can be decrypted is on the Rune Server, since it is the only one who owns the private key PrivKeyServer. To authenticate, device Runer1 additionally sends, to the Server, a HASH message signed by its own private key:

[HASH(PublicKeyServer(HELLO))]PrivKeyRuner1

(2) Having verified the received data, the Rune server returns the public key of the second cryptowallet (PublicKeyRuner2) to Runer1, using the same data encryption and signature algorithm.

(3) Having received the necessary data, the Runer1 device/application is enabled to send encrypted and signed messages to Runer2. The Rune server is unable to decrypt them.

(4) The server sends the received data to the second cryptowallet, without modifying them, but adding the encrypted and signed public key for the Runer1 device/application to the data.

(5) Then, the Runer2 device/application:
decrypts PublicKeyRuner2(PublicKeyRuner1);
verifies [HASH(PublicKeyRuner2(PublicKeyRuner1))]$_{PrivKeyServer}$;
decrypts PublicKeyRuner2(DATAroken);
verifies [HASH(PublicKeyRuner2(DATAroken))]$_{PrivKeyRuner}$1.

Information on Rokens Stored on the Server

The server stores complete information about each Roken in the form of entries. All entries are structured and stored in a database. Any modifications are registered and archived by the database management system.

The Rune System fills and modifies the database entries automatically. The user has no access to the process and cannot influence it. However, they may be sure that the same set of parameters will always produce the same result. Each Roken is described by the following entries:

(i) Blockchain address [PublicKey]—This parameter, which is the real blockchain address of the Roken, is computed automatically at the moment of emission (see equation (2));

(ii) Cryptocurrency type—This entry contains the type of the cryptocurrency that is associated with the Roken being emitted/issued;

(iii) Value—This entry contains the amount of the cryptocurrency associated with the given Roken;

(iv) Holder [HASH(ID)]—This entry contains the hash function value provided by the actual holder of the given Roken. Anyone who provides the hash value to the server, becomes the new holder;

(v) Holder's device/application [IDRuner]—This entry contains the current ID of the holder's Runer device/application;

(vi) Private key [PrivKey2]—This entry contains information about the private key, which is a part of the shared private key of the given Roken;

(vii) Status—This entry contains extra information about a banknote of the Roken, such as error codes, reasons of denial, current status of money.

The IDRuner field can be added to control the usage of Rokens, allowing to follow the entire history of holders of a given Roken. The system knows the exact Runer devices and Runer applications that have ever held a given Roken and when it was transferred.

Using various entry rules, one may set use options for Roken notes (by modifying their "Status" entries), such as:

Defer activation of a banknote by a week;
Limit the valid term of a banknote;
etc.

The list of rules above is by no means exhaustive, but only shows some exemplary rules to demonstrate the capabilities of the proposed system.

Interactions Between Users in the System

The transfer of rights to use Roken banknotes involves one of the three operations:
a payment order for a specific Receiver;
a payment order for a bearer; or
a payment request.

The first two options involve the transfer of rights to another user.

When implementing any of the options above, the Rune System generates the following notifications to users that require or do not require any response from their Runers:

(i) A payment order for a specific Receiver notifies the Receiver through their Runer device or application. If they don't confirm the order within a given time limit (or in case the notification has not reached the Receiver), the order will be nullified, and the Payer will be notified of that fact. If the Receiver confirms the order (and the notification has reached the Receiver), they Payer will also receive a corresponding notification through their Runer.

(ii) A payment order for a bearer notifies the Payer through their Runer that they no longer own the given Roken.

(iii) A payment request notifies the Payer through their Runer that they are asked to pay a certain amount of money. The payer may respond with the number of Rokens owned by them that they are willing to pay.

A payment order for a bearer is a special type of order, which may be both digital and material. When such a contract is made, the user receives a Runote, a visual link to the Roken ID. This visual link (usually in the form of an image) may be printed on any material and can be read by the Runer's machine vision system. Also, the Runote ID may be inputted manually by the user using the Runer's input means.

Before transferring the Roken ownership rights, the new holder may always ensure themselves that the claimed Roken value is valid. The Payer may securely transfer the Roken's HASH(ID) for the Seller to verify it using the Rune server.

There are some possible outcomes for each Roken:
Roken has not been identified.
Roken has been identified. Status: Roken has been redeemed/Roken emission term has expired.
Roken has been identified. Its value in the blockchain has been confirmed. Status: to be transferred to the bearer, open for acquisition.
Roken has been identified. It has been redeemed.

Private Key Restoration Algorithm

Mnemonic seed is the most common algorithm for restoring user's private keys. The majority of cryptowallets use one of the three Bitcoin Improvement Proposals (BIP) standards: BIP-32, BIP-39 or BIP-44.

Figure 8:
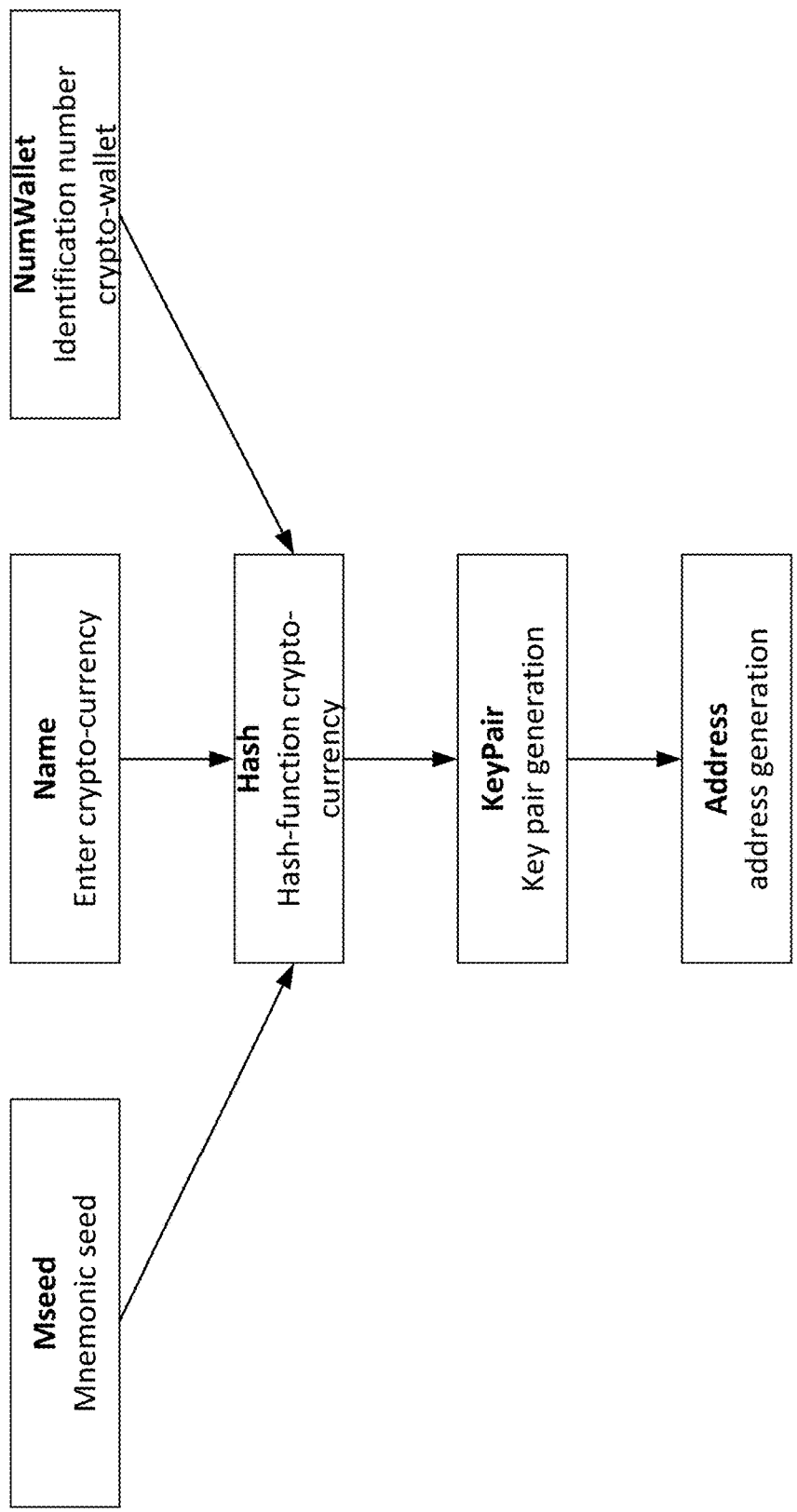
FIG. 8 illustrates the sequence for restoring the private key, on the Runer device or in the Runer application.

FIG. 8 illustrates the sequence for restoring the private key (which does not specifically apply to the Rune System, but may apply to other architectures), on the Runer device or in the Runer application. To restore the first part of a Roken's private key, the same algorithm is proposed as for the main part of the Runer, i.e., the Mnemonic seed algorithm. As shown in FIG. 8, the algorithm works as follows:

(1) let there be a private key PrivKey1.1, which has been first generated by the user's Runer device or application (it is the first part of the private key PrivKey);

(2) in order to restore PrivKey later, a child key (mnemonic seed) is generated—PrivateKeyMnemonic. It may inherit properties using the BIP-32 scheme: private parent key=>private child key, aka hardened derivation. Or, it may be generated using our algorithm, wherein the cryptocurrency name is replaced with Rune;

(3) it is also possible to use the same key (since the difference will not be the same for different keys), or to generate individual PrivateKeyMnemonicN for each PrivateKeyN;

(4) then the difference (diff) is calculated using the following formula:

$$\text{PrivateKey}_1 - \text{PrivateKeyMnemonic} \bmod n = \text{diff}, \quad (3)$$

where n is the order of the base point G on the curve secp256k1.

(5) The resulting diff value is stored on the Rune server.

Neither the server, nor a scammer can restore PrivateKey1 without the mnemonic seed of the holder (Runer). The diff value also will not help scammers accomplish anything. In order to restore the Roken key using the mnemonic seed, the user has to obtain the diff value from the server and apply the following formula:

$$\text{diff} + \text{PrivateKeyMnemonic} \bmod n = \text{PrivateKey1} \quad (4)$$

In this case, it is assumed that the Runer user has written down the mnemonic seed used to generate their cryptowallet and has kept it secure since that time.

Figure 9:
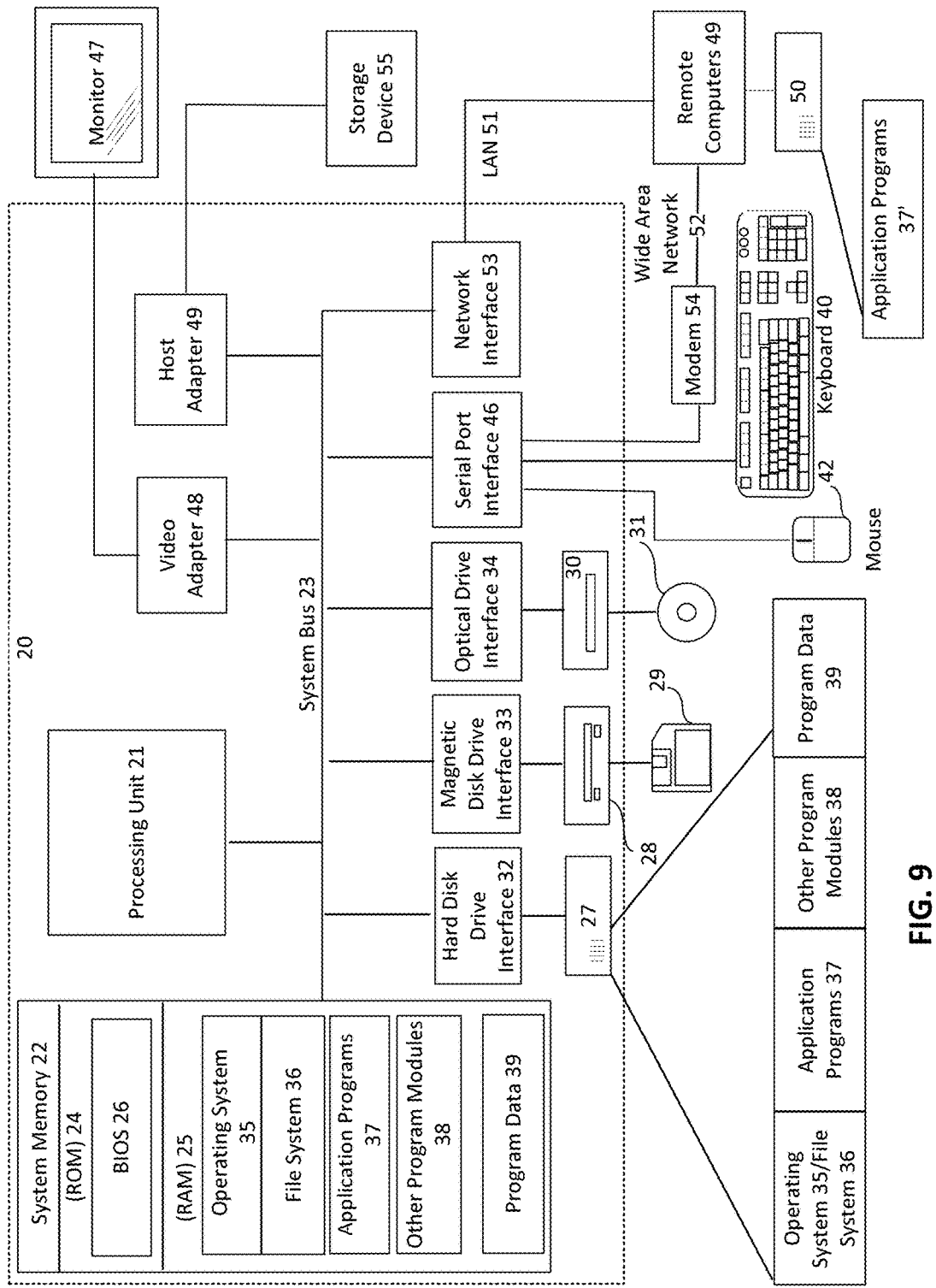
FIG. 9 shows an exemplary computing system for implementing the invention.

With reference to FIG. 9, an exemplary system for implementing the invention includes a general purpose computing device in the form of a host computer or a server or a tablet/mobile device 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for cryptocurrency transactions, the system comprising:
   a server configured to communicate with a plurality of user devices and to mediate exchange of data between the user devices;
   an internal currency supported by the server and which is derivable from any cryptocurrency;
   each user device configured to issue, transferrights, redemption and restoration of an internal currency unit,
   wherein issue of the internal currency unit includes creation of new addresses in the blockchain, and rights to the new addresses are protected by dividing the private key PrivKey into a first part (PrivKey1) and a second part (PrivKey2),
   wherein issue of the internal currency unit includes generating the private key PrivKey for the internal currency unit and dividing the private key PrivKey into the first part (PrivKey1) and the second part (PrivKey2), and then connecting to the blockchain only once for a particular transaction,
   wherein the private key PrivKey is divided based on PrivKey*G=(PrivKey1*PrivKey2)*G, where G is a base point on an elliptical curve,
   wherein PrivKey1 is generated and stored in the server, and PrivKey2 is generated and stored on the user device,
   where the server stores the private key PrivKey1 from the internal currency unit and information about a device ID of the user device that stores the corresponding private key PrivKey2,
   wherein redemption of the cryptocurrency unit corresponding to the private key PrivKey requires providing both PrivKey1 and PrivKey2;
   wherein a public key PublicKey of the internal currency unit is known to the server and the user device, such that PrivKey1*(PrivKey2*G)=PrivKey2*(PrivKey1*G)=PublicKey,
   wherein any user with the public key PublicKey can check a balance of the cryptocurrency of the corresponding private key PrivKey but needs the private key PrivKey to redeem or transfer cryptocurrency rights,
   wherein a transfer of rights to the internal currency unit includes transferring the PrivKey2 to a new owner and changing a record of the device ID on the server,
   wherein redemption of the internal currency unit with the private key PrivKey requires providing both PrivKey1 and PrivKey2.

2. The system of claim 1, wherein the issue, transfer of rights, and redemption, can only be performed using the user device or an application that emulates the user device.

3. The system of claim 1, wherein user device can generate visual representations of banknote or banknotes for the internal currency unit.

4. The system of claim 3, wherein an owner of the internal currency unit is identifiable using a hash value of a unique identifier of a banknote and using the device ID.

5. The system of claim 4, wherein the owner may be changed only after the required unique identifier is transferred to the server, together with the hash value generated by the new holder.

6. The system of claim 3, wherein each banknote comprises an image or images, and wherein by transferring the image, the user transfers their ownership rights to use the internal currency unit, and wherein each banknote has a PIN code.

7. The system of claim 3, wherein the transfer of rights to use the banknotes involves one of the following:
   a payment order for a specific user;
   a payment order for a bearer; or
   a payment request.

8. The system of claim 1, wherein the redemption of the internal currency unit includes transferring the device ID to the server, together with a hash value of a unique identifier of a banknote, receiving a corresponding PrivKey2 from the server, and deleting the internal currency unit, and wherein the owner can then use a corresponding cryptocurrency for blockchain transactions.

9. The system of claim 1, wherein the server stores communication public keys of the users in a database, and an encrypted channel is used to exchange internal currency units, and also the server stores its own communication public key and private key, and the server's communication public key is also stored on the user device.

10. The system of claim 1, wherein the server stores information on all issued internal currency units, including blockchain address, cryptocurrency type, value, current owner, current owner's device, PrivKey2 and status, including error codes, reasons of denial and current state of money.

11. The system of claim 1, wherein the private keys are restorable on the user's device using a mnemonic seed algorithm.

12. A method for cryptocurrency transactions, the method comprising:
   supporting an internal currency on a server, the internal currency being derivable from any cryptocurrency, wherein the server is configured to communicate with a plurality of user devices and to mediate exchange of data between the user devices, and wherein each user device is configured to issue, transfer rights, redemption and restoration of an internal currency unit;
   issuing the internal currency, wherein the issuing includes creation of new addresses in the blockchain, and wherein rights to the new addresses are protected by splitting the private key PrivKey into a first part (PrivKey1) and a second part (PrivKey2);
   wherein the issuing of the internal currency unit includes generating the private key PrivKey for the internal currency unit and for splitting each private key into the first part (PrivKey1) and the second part (PrivKey2) and then connecting to the blockchain only once for a particular transaction,
   wherein the private key PrivKey is divided split based on PrivKey*G=(PrivKey1*PrivKey2)*G, where G is a base point on an elliptical curve,
   generating and storing the first part PrivKey1 on the server;
   generating and storing the second part PrivKey2 on the user's device,
   such that the server stores the PrivKey1 from the internal currency unit, and information about a device ID of the user's device that stores the corresponding PrivKey2,
   wherein redemption of the cryptocurrency unit corresponding to the private key PrivKey requires providing both PrivKey1 and PrivKey2;
   wherein a public key PublicKey of the internal currency unit is known to the server and the user's device, such that PrivKey1*(PrivKey2*G)=PrivKey2*(PrivKey1*G)=PublicKey,
   wherein any user with the public key PublicKey can check a balance of the cryptocurrency of the corresponding private key PrivKey but needs the private key PrivKey to redeem or transfer cryptocurrency rights,
   wherein a transfer of rights to the internal currency unit includes transferring the PrivKey2 to a new owner and changing a record of the device ID on the server, and
   wherein redemption of the internal currency unit with the private key PrivKey requires providing both PrivKey1 and PrivKey2.

13. The method of claim 12, further comprising generating visual representations of banknote or banknotes for the internal currency unit on the user device.

14. The method of claim 13, wherein an owner of the internal currency unit is identifiable using a hash value of a unique identifier of the banknote and using the device ID.

15. The method of claim 14, wherein the owner may be changed only after the required unique identifier is transferred to the server, together with the hash value generated by the new holder.

16. The method of claim 13, wherein the transfer of rights to use the banknotes involves one of the following:
   a payment order for a specific user;
   a payment order for a bearer; or
   a payment request.

17. The method of claim 12, wherein the redemption of the internal currency unit includes transferring the device ID to the server, together with a hash value of a unique identifier of a banknote, receiving a corresponding PrivKey2 from the server, and deleting the internal currency unit, and wherein the owner can then use a corresponding cryptocurrency for blockchain transactions.

18. The method of claim 12, further comprising storing communication public keys of the users in a database on the server, and using an encrypted channel to exchange the internal currency units, and storing the server's own communication public key and private key on the server, and storing the server's communication public key on the user device.

19. The method of claim 12, further comprising storing, on the server, information on each issued internal currency unit, including its blockchain address, cryptocurrency type, value, current owner, current owner's device, PrivKey2 and status, including error codes, reasons of denial and current state of money.

* * * * *